United States Patent [19]
Kawamoto et al.

[11] Patent Number: 6,078,369
[45] Date of Patent: *Jun. 20, 2000

[54] METHOD OF FABRICATING AN ACTIVE MATRIX LIQUID CRYSTAL DISPLAY WITH REPEATING REPAIR LINE PATTERN

[75] Inventors: Satoru Kawamoto; Yoshinori Numano; Ken Nakasima, all of Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/151,298

[22] Filed: Sep. 11, 1998

Related U.S. Application Data

[62] Division of application No. 08/919,319, Aug. 28, 1997.

[30] Foreign Application Priority Data

Feb. 6, 1997 [JP] Japan ................................. 9-023990

[51] Int. Cl.[7] ................................................. G02F 1/1333
[52] U.S. Cl. ................................................................. 349/54
[58] Field of Search .................................................. 349/54

[56] References Cited

FOREIGN PATENT DOCUMENTS

| | | |
|---|---|---|
| 3-23425 | 1/1991 | Japan . |
| 3-85525 | 4/1991 | Japan . |
| 3-98023 | 4/1991 | Japan . |
| 3-259222 | 11/1991 | Japan . |
| 4-37824 | 2/1992 | Japan . |
| 2523190 | 5/1996 | Japan . |

*Primary Examiner*—James A. Dudek
*Attorney, Agent, or Firm*—Oblon, Spivak, McClelland, Maier & Neustadt, P.C.

[57] ABSTRACT

A matrix liquid crystal display device including at least a TFT array substrate, an opposite substrate arranged opposite to the TFT array substrate, a liquid crystal material interposed between the TFT array substrate and the opposite substrate, TCPs and PCBs; the TFT array substrate including thereon bus lines connected with the TCPs, repair lines, and TFTs; the repair lines being provided on a periphery of the TFT array substrate by means of divisional exposure, wherein the repair lines are provided in such a manner that at least two of the same line patterns are repeated.

6 Claims, 4 Drawing Sheets

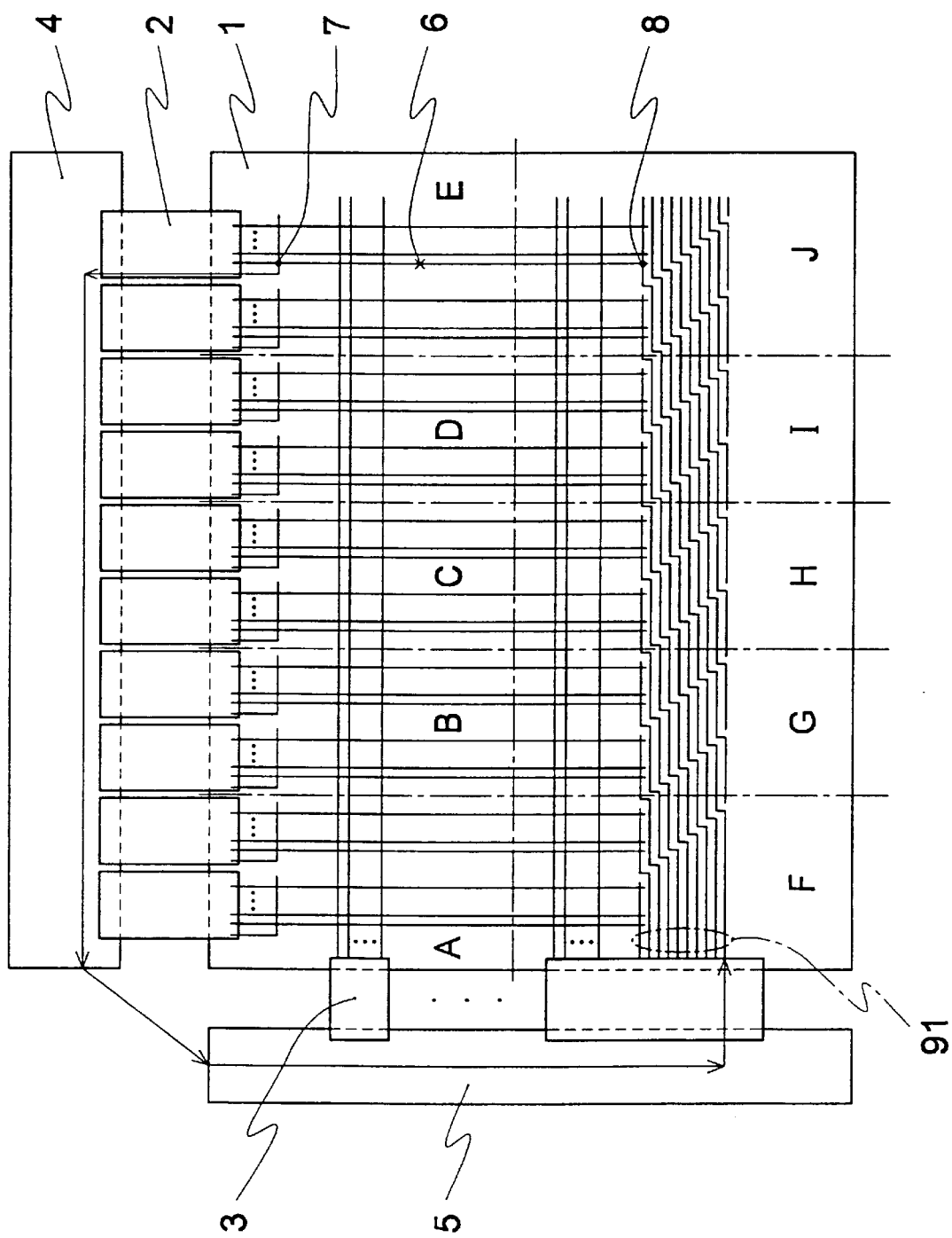

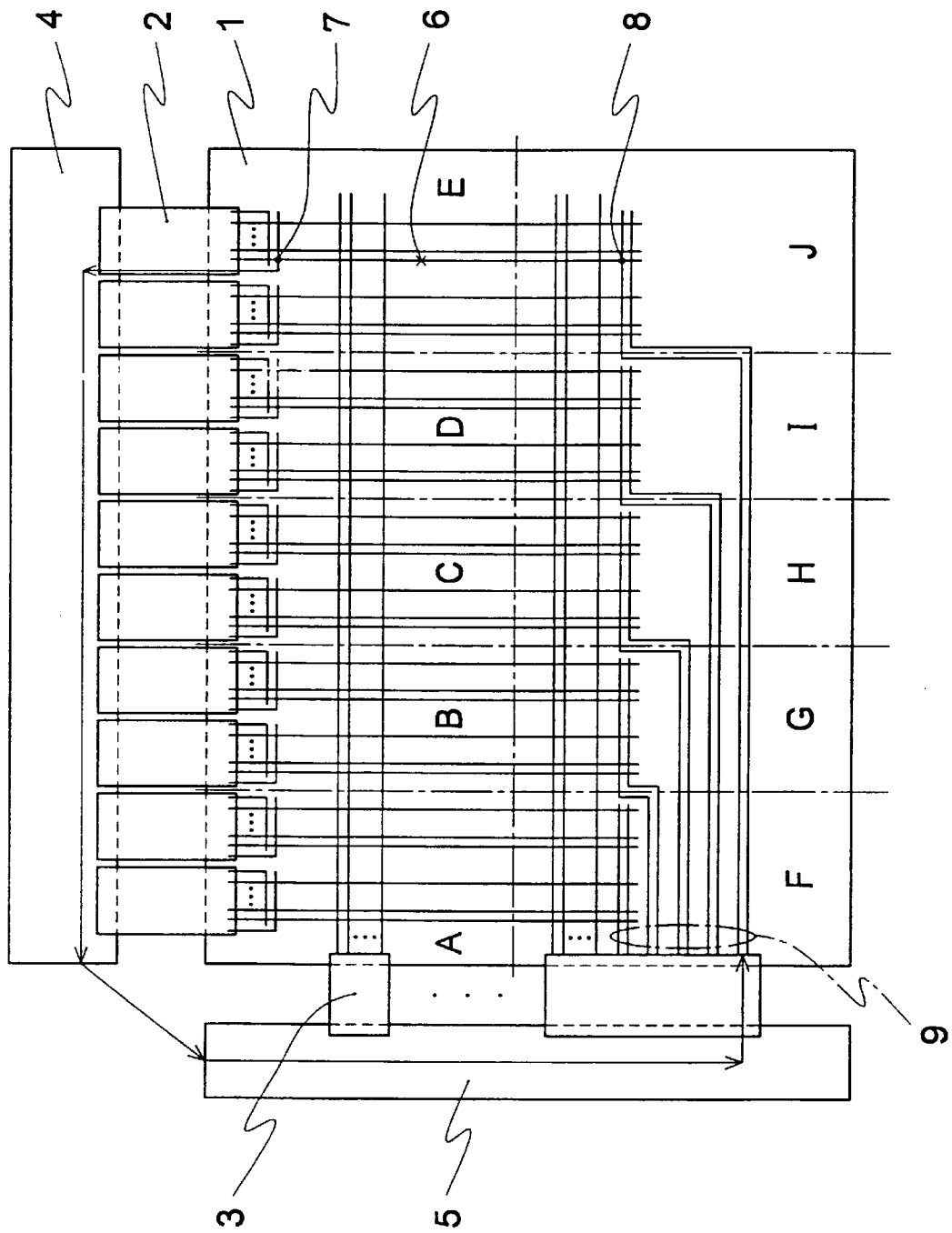
PRIOR ART FIG. 3

METHOD OF FABRICATING AN ACTIVE MATRIX LIQUID CRYSTAL DISPLAY WITH REPEATING REPAIR LINE PATTERN

This is a division of Ser. No. 08/919,319 Aug. 28, 1997

BACKGROUND OF THE INVENTION

The present invention relates to an active-matrix liquid crystal display device having a property to be able to repair disconnection (open failure) in a bus line and relates to a method of fabricating the same. More particularly, the present invention relates to patterning of lines for repair (hereinafter referred to as repair lines) provided on the periphery of a thin film transistor (hereinafter referred to as TFT) array substrate so as to eliminate or repair a display defect which occurs in a display area when a bus line disconnects or has open failures and relates to a method of pattern processing of repair lines.

By adopting an active matrix type, a liquid crystal display device (hereinafter referred to as a liquid crystal display) has enabled displaying function which is not inferior to that obtained by a cathode ray tube.

The active matrix liquid crystal display (hereinafter, referred to as AM-LCD) with fine resolution and enlarged display size is expected and is being brought to the commercial stage.

However, it is inevitable that the number and the lengths of the bus lines increase as the size of the AM-LCD becomes large.

It is therefore supposed that the occurrence of disconnection in bus lines increases but it has been very difficult to fabricate an enlarged AM-LCD having no disconnection.

As for such disconnection, AM-LCDs having the property to be able to repair a disconnection in a case in which such disconnection in a bus line occurs, are under development.

The conventional AM-LCDs having the property to be able to repair disconnection are disclosed, for example, in Japanese Unexamined Patent Publication Nos. 23425/1991, 85525/1991, 98023/1991, 259222/1991 and 37824/1992.

However, the examples disclosed in these above publications are all directed to a case in which tape carrier packages (TCPs) are mounted on an upper side and a lower side of source lines. Thus, in a case in which a TCP is mounted on only one side it is required that a line for repair (a repair line) is provided on the unmounted side terminal portion where the TCP is not mounted, so that the repair line is available to be connected for each TCP.

In this case, to each TCP, the repair line is necessary to be drawn around outside with minimizing capacity as small as possible to the utmost.

Thus, the repair lines are usually designed so as to be provided without intersecting other lines. Therefore, a in case when the whole line pattern is divided and divided line patterns are arranged for divisional exposure by a pattern exposure system, each divided line pattern is provided as one which is different from each other. Thus, it is required to prepare numerous line patterns, and numerous masks (reticles).

Further, because the number of mask (reticle) changes is numerous, there is a problem that exchanging masks causes productivity to be deteriorated.

The term "TCP" is defined and explained as follows for example in a publication "Flat Panel Display '95 (Nikkei Micro Device separate volume, Nikkei BP Company)" on page 234: "A flexible tape on which a drive IC is mounted by means of gang bonding is referred to as a TCP and the technique is referred to as tape automated bonding (TAB). A connection pitch, configuration and flexibility in mounting such as a structure having opening and a structure capable of bending are the features. The TCP may be recognized to be suitable mounting form for a refined connection pitch and for a module design with slim profile, reduced weight and compact size, where a liquid crystal panel is enhanced in capacity, resolution and display in color. Further, the configuration according to an embodiment in which such a TCP is mounted is illustrated in FIG. 15 on page 233 of the above publication. Still further, summarized explanation relating to TAB mounting is also introduced in a publication "Monthly Display" Vol. 8, 1996 on pages 19 to 31. Hereinafter, detailed explanation concerning "TCP" is omitted.

FIG. 3 is a schematic drawing illustrating arrangement of repair line (that is, a line for repair) in a conventional matrix liquid crystal display (AM-LCD).

In the drawing, numeral 1 denotes a TFT array substrate, numeral 2 denotes a TCP provided on the source side (hereinafter, referred to as a source side TCP) on which a drive circuit IC provided on the source side (hereinafter, referred to as a source side drive circuit IC) is mounted, numeral 3 denotes a TCP provided on the gate side (hereinafter, referred to as a gate side TCP) on which a drive circuit IC provided on the gate side (hereinafter, referred to as a gate side drive circuit IC) is mounted, numeral 4 denotes a peripheral printed circuit board (or PCB) provided on the source side periphery (hereinafter referred to as a source side peripheral printed circuit board), numeral 5 denotes a peripheral printed circuit board provided on the gate side periphery (hereinafter, referred to as a gate side peripheral printed circuit board), numeral 6 denotes a disconnection portion, numeral 7 denotes a first connection point, numeral 8 denotes a second connection point, and numeral 9 denotes a repair line.

According to the conventional art, a line (that is, a repair line for connecting a disconnection portion in a bus line) to be connected from the underside (in the drawing) as shown in FIG. 3 is, for example, routed to a terminal in the opposite side of ten pieces of the source side TCP 2, every two of the lines being routed in pairs, the repair lines being provided in each individual pattern.

A method of repair in a case in which a disconnection in a bus line occurs is described below. For example, in case when a line is disconnected at disconnection portion 6 shown in FIG. 3, the intersecting portion where two lines which are denoted by numerals 7 and 8 intersect each other will be irradiated by laser light to be melted. As the result, two lines will be connected at the intersecting portion. Therefore, a signal input from the opposite side in such a manner that the signal input is transmitted from the source side TCP 2, via the source side peripheral circuit 4 and the gate side peripheral circuit 5, to the repair line 9 through electrically connected circuits is possible.

Because, as shown in FIG. 3, five areas for exposing (exposure areas) F to J in the conventional art which are related to repair lines 9 are arranged as individually configured repair lines different from each other, the repair lines 9 are provided by forming individually configured line patterns different from each other.

In a case in which in a photolithography processing step, by using a pattern exposure system for example "FX-501D series" supplied by NIKON CORPORATION, a whole line pattern on TFT substrate 1 is divided and divided line patterns are exposed one by one, the size of an effective area in a rectangle (length of the diagonal line is 14 cm, long side is 13 cm) is about 10 cm×10 cm. Further, the number of masks exchangeable with high speed is six or less at most.

However, as shown in FIG. 3 the number of exposure areas on the TFT array substrate 1 is ten denoted by A to J, While areas denoted by B, C and D are arranged in the same configured line patterns, the line patterns for other exposure areas are different from each other. Thus, in a case when a display area of the TFT array substrate 1, the size of which is over about 15", is exposed, the number of necessary masks exceeds inevitably 6 because each necessary mask must cover both the inside of the display area and the peripheral area Therefore, the productivity deteriorates and designing a mask is complicated.

As described above, since a plurality of patterns of exposure areas covering the repair lines (lines for repair) in the conventional matrix liquid crystal display device are formed by using patterns different from each other, each pattern requires a pattern different from the others. Therefore, in a case in which line patterns are provided by divisional exposure by using an exposure machine because the number of masks increases and the number of exchanging masks increases, there is a problem that the productivity deteriorates.

SUMMARY OF THE INVENTION

The present invention is achieved to solve the above problem and the object of the present invention is to realize a matrix liquid crystal display device which enables to enhance the productivity greatly and a method of fabricating the same, by reducing the number of masks which are employed in fabricating a TFT array substrate and by shortening the time for an exposure step.

In order to solve the above problem, a matrix liquid crystal display device according to the present invention is a matrix liquid crystal display device comprising a TFT array substrate, an opposite substrate arranged opposite to the TFT array substrate, a liquid crystal material interposed between the TFT array substrate and the opposite substrate, TCPs and PCBs; the TFT array substrate including thereon bus lines connected with the TCPs, repair lines, and TFTs; the repair lines being provided on a periphery of the TFT array substrate by means of divisional exposure, wherein the repair lines are provided in such a manner that at least two of the same line patterns are repeated.

Preferably, the repeat cycle of the same line pattern is defined by every two TCPs of the TCPs.

Further preferably, the repeat cycle of the same line pattern is defined by every one TCP of the TCP.

In order to solve the above problem, a method of a matrix liquid crystal display device according to the present invention is a method of fabricating a matrix liquid crystal display device including a TFT array substrate on a periphery of which by means of divisional exposure, wherein the repair lines are provided by repeating the same configuration of the line pattern at least two times.

Preferably, the repeat cycle of the same line pattern is defined by every two TCPs of said TCPs.

Further preferably, the repeat cycle of the same line pattern is defined by every one TCP of the TCPs.

BRIEF DESCRIPTION OF THE DRAWINGS

FIG. 2 is a schematic drawing illustrating an arrangement of repair lines in the matrix liquid crystal display device according Embodiment 2;

FIG. 3 is a schematic drawing illustrating an arrangement of repair lines in the conventional matrix liquid crystal display device.

DETAILED DESCRIPTION

Embodiment 1

Figure 1A:
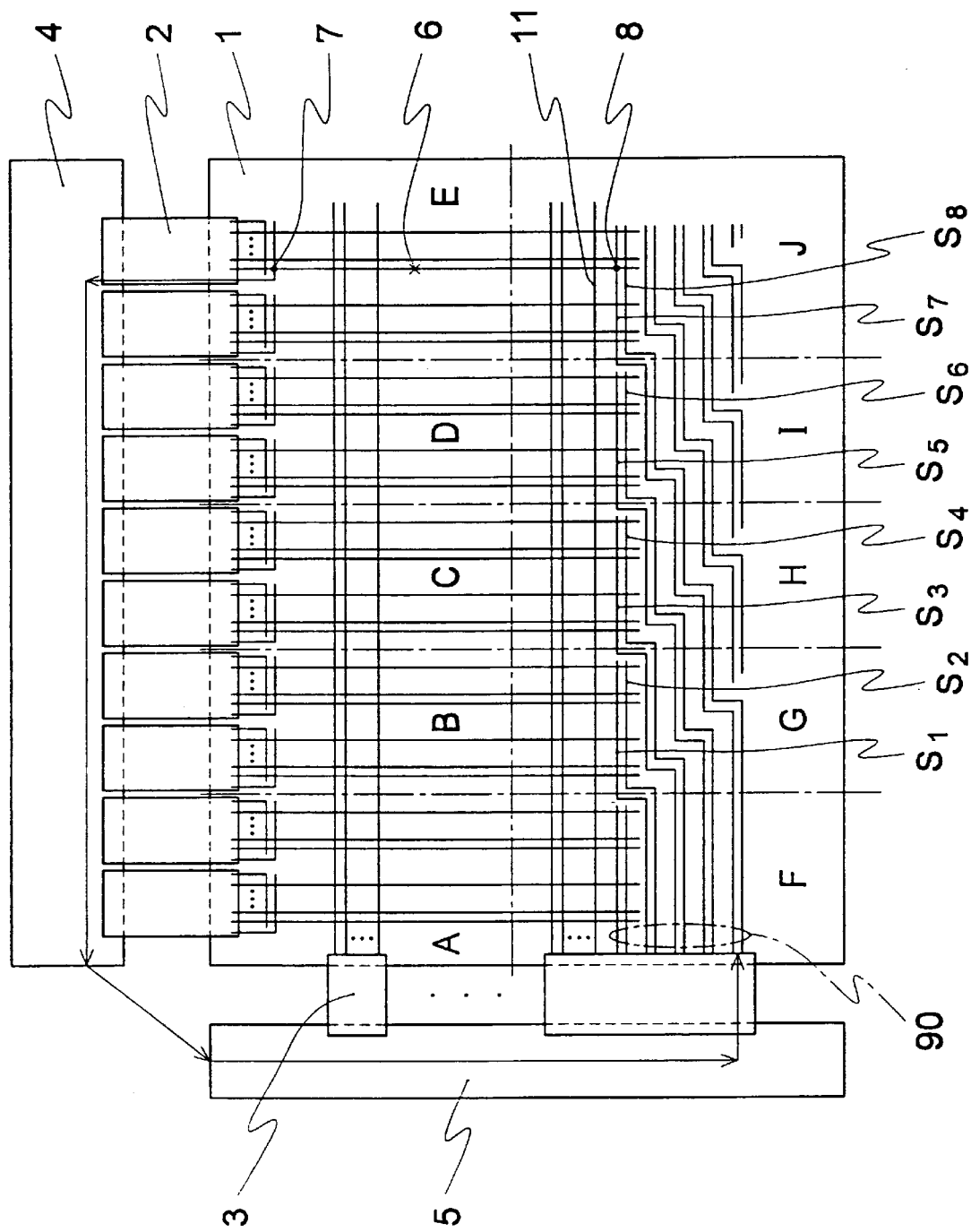
FIG. 1A is a schematic drawing illustrating an arrangement of repair lines in the matrix liquid crystal display device according to Embodiment 1.

Hereinafter, one embodiment according to the present invention is described referring to the attached drawings. The same reference numerals as employed in the drawing for conventional art denote the same or the equivalent portions.

Figure 1B:
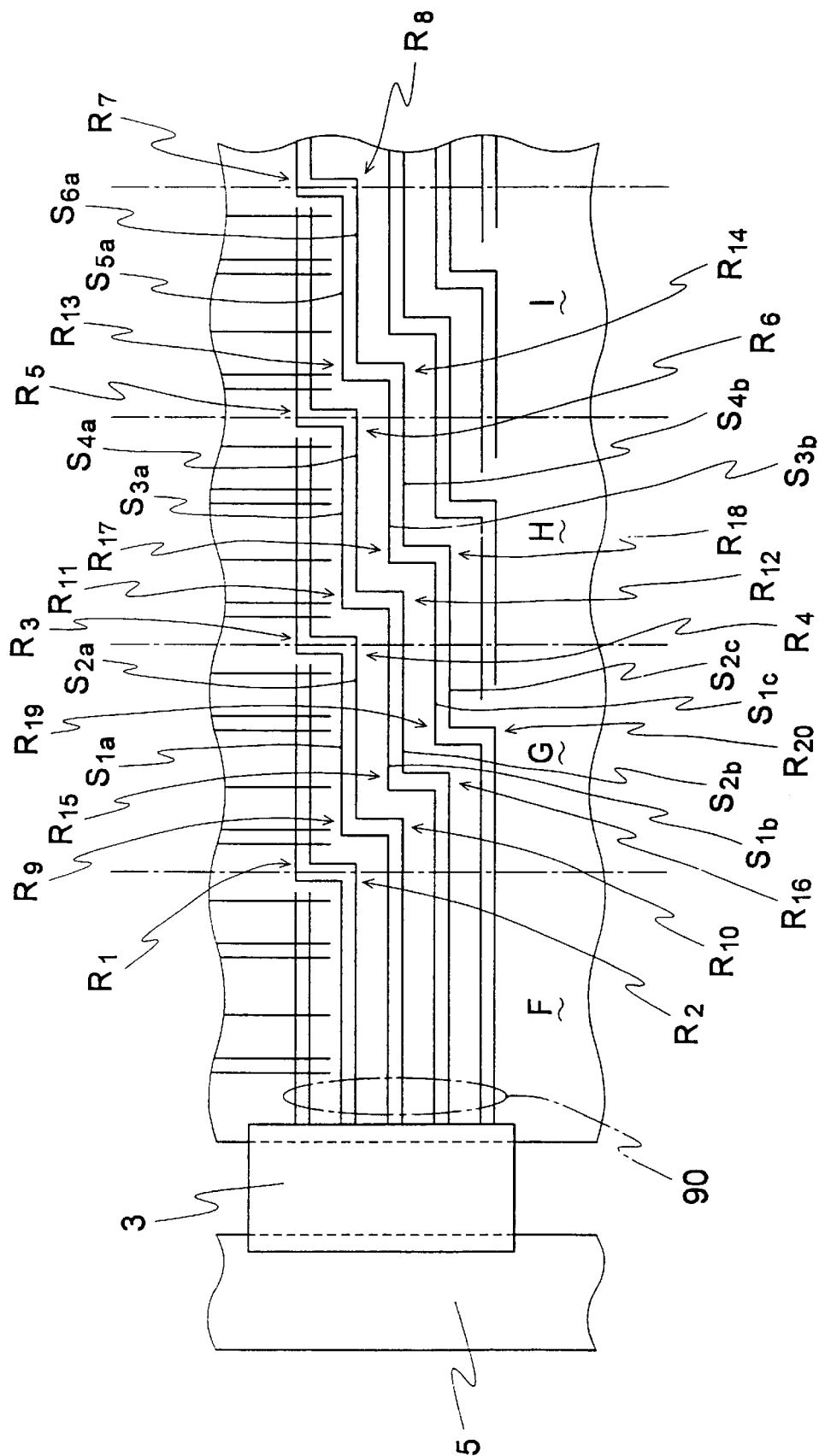
FIG. 1B is a magnified drawing illustrating an arrangement of repair lines.

FIG. 1A is a schematic drawing illustrating an arrangement pattern in which repair lines (lines for repair) in an active matrix liquid crystal display device (AM-LCD) of for example 15.1" diagonal size according to Embodiment 1 of the present invention are provided. FIG. 1B is a partially enlarged view illustrating a part of the arrangement pattern shown in FIG. 1A.

In FIG. 1A and FIG. 1B, numeral 1 denotes a TFT array substrate, numeral 2 denotes a source side TCP on which a source side drive circuit IC is mounted, numeral 3 denotes a gate side TCP on which a gate side drive circuit IC is mounted, numeral 4 denotes a source side PCB, numeral 5 denotes a gate side PCB, numeral 6 denotes a disconnection portion (a portion of open failure), numeral 7 denotes a first connection point, numeral 8 denotes a second connection point, numeral 11 denotes a source line, and numeral 90 denotes a repair line.

As shown in FIG. 1A, the repair lines 90 of the matrix liquid crystal display device according to Embodiment 1 are composed of ten repair lines provided in the pattern. Only two repair lines among repair lines 90 are intersected with a first group source lines and a second group source lines in an area F on the opposite side of first and second source side TCP 2. On the other hand, the remaining eight repair lines are arranged so that they are not intersected with the first group and the second group source lines and are parallel with each other.

The first repair line is designed in such a manner that the first repair line can be connected with the first group and the second group source lines of the opposite side of first and second source side TCPs 2.

The first repair line and second repair line are terminated in the vicinity of a boundary between the area F and area G.

Next, a third repair line and fourth repair line include two straight line portions and one corner portion, two straight line portions having two lines, one corner portion having two angles: straight line portion, each extending parallel to the first repair line and the second repair line; corner portion 5 $R_1$ and $R_2$ on the boundary between area F and area G where the repair lines turn by 90 degrees; straight line portion $S_1$ and $S_2$ extending in the same direction of the first repair line and the second repair line; the third repair line and the fourth repair line being designed in such a manner that the third repair line and the fourth repair line can be connected with the third group and the fourth group source lines in the area G on the opposite side of a third and a fourth source side TCPs 2.

A fifth repair line and sixth repair line include three straight line portions and two corner portions: straight line portions, each extending parallel to the first repair line and the second repair line; corner portion 5 $R_9$ and $R_{10}$ in the area G where the repair lines turn by 90 degrees (in other words, the repair lines are extended in the direction perpendicular to the direction of the three straight line portions); straight line portions $S_{1a}$ and $S_{2a}$ extending in the same direction of the third repair line and the fourth repair line; corner portions $R_3$ and $R_4$ in a vicinity of the boundary between area G and area H where the repair lines turn by 90 degrees; straight line portions $S_3$ and $S_4$ extending in the same direction of the first repair line and the second repair line, the fifth repair line and the sixth repair line being arranged so that the fifth repair line and the sixth repair line are capable of being connected to the fifth repair line and the sixth repair line both located in the area of source lines which are connected to the fifth source side TCP and the sixth source side TCP on the source side peripheral printed circuit board 4.

A seventh repair line and eighth repair line include four straight line portions and three corner portions: straight line portions, each extending parallel to the first repair line and the second repair line; corner portions $R_{15}$ and $R_{16}$ in the area G where the repair lines turn by 90 degrees (in other words, the repair lines are extended in the direction perpendicular to the direction of the four line portions); straight line portions $S_{1b}$ and $S_{2b}$ extending in the same direction of the fifth repair line and the seventh repair line; corner portions $R_{11}$ and $R_{12}$ in the area H; straight line portions $S_{3a}$ and $S_{4a}$ extending in the same direction of the third repair line and the fourth repair line; corner portions $R_5$ and $R_6$ where the repair lines turn by 90 degrees in the vicinity of the boundary between area H and I; straight line portions $S_5$ and $S_6$ extending in the same direction of the first repair line and the second repair line, the seventh repair line and the eighth repair line being arranged so that the seventh repair line and the eighth repair line are capable of being connected to the seventh repair line and the eighth repair line both located in the area of source lines which are connected to the seventh and the eighth source side of TCPs on the source side peripheral printed circuit board 4.

A ninth repair line and tenth repair line include five straight line portions and four corner portions; straight line portions, each extending parallel to the first repair line and the second repair line; corner portions $R_{19}$ and $R_{20}$ in the area G where the repair lines turn by 90 degrees (in other words, the repair lines are extended in the direction perpendicular to the direction of the five straight line portions); straight line portions $S_{1C}$ and $S_{2C}$ extending in the same direction of the seventh repair line and the eighth repair line; corner portions $R_{17}$ and $R_{18}$ in the area H; straight line portions $S_{3b}$ and $S_{4b}$ extending in the same direction of the fifth repair line and the sixth repair line; corner portions $R_{13}$ and $R_{14}$ where the repair lines turn by 90 degrees in the area I; stright line portions $S_{5a}$ and $S_{6a}$ extending in the same direction of the third repair line and the fourth repair line; corner portions $R_7$ and $R_8$ where the repair lines turn by 90 degrees in the vicinity of the boundary between area I and area J; and straight line portions $S_7$ and $S_8$ extending in the same direction of the first repair line and the second repair line, the ninth repair line and the tenth repair line being arranged so that the ninth repair line and the tenth repair line are capable of being connected to the ninth repair line and the tenth repair line both located in the area of source lines which are connected to the ninth and the tenth source side of TCPs on the source side peripheral printed circuit board 4.

The third repair line and the fourth repair line are designed in such a manner that the third repair line and the fourth repair line can be connected with two of the third group and the fourth group source lines which are connected to the third and the fourth source side TCPs 2. Similarly, the fifth repair line and the sixth repair line are designed in such a manner that the fifth repair line and the sixth repair line can be connected with two of the fifth group and the sixth group source lines which are connected to the fifth and the sixth source side TCPs 2. Further, the seventh repair line and the eighth repair line are designed in such a manner that the seventh repair line and the eighth repair line can be connected with two of the seventh group and the eighth group source lines which are connected to the seventh and the eighth source side TCPs 2.

Still further, the ninth repair line and the tenth repair line are designed in such a manner that the ninth repair line and the tenth repair line can be connected with two of the ninth group and the tenth group source lines which are connected to the ninth and the tenth source side TCPs 2. The other remaining repair lines provided on areas H, I and J are not for use. . Line patterns provided in a similar manner to that described above for the repair lines 90 can be a repeatable pattern having the same configuration which is provided in a manner in which the whole display area is divided by each two TCPs on the source side peripheral printed circuit board 4. Thus, if the display area is divided into the similar exposure areas to that for the conventional art, three exposure areas G, H and I among all the divided areas where a line pattern of the repair line 90 on the TFT array substrate can be provided in the form of the same line pattern.

Further, since three areas B, C and D in the bus line area on the TFT array substrate 1 are originally provided in the form of the same line pattern, the TFT array substrate 1 according to the embodiment 1 of the matrix liquid crystal display device shown in FIG. 1 can be formed with six kinds of line patterns.

According to the conventional art, eight masks (reticles) are necessary in order to provide line patterns for ten exposure areas on the TFT array substrate comprising A, B, C, D, E, F, G, H, I and J. In Embodiment 1, however, three areas G, H and I can be provided with the same line pattern by forming repair lines with repeatable pattern for every two TCPs on the source side peripheral printed circuit board 4.

Further, because areas B, C and D are provided with the same pattern, the number of the kinds of the line pattern, the number of the kinds of the line patterns on the TFT array substrate is reduced to 6, it becomes possible to make the number of the masks 6 or less with which line patterns are provided on the TFT array substrate 1 with high speed access. Therefore, productivity can be enhanced.

Embodiment 2

FIG. 2 is a schematic drawing illustrating an arrangement pattern in which repair lines (lines for repair) in a matrix liquid crystal display device of 15.1" diagonal size according to Embodiment 2 of the present invention are provided.

In the drawing, numeral 1 denotes a TFT array substrate, numeral 2 denotes a source side TCP on which a source side drive circuit IC is mounted, numeral 3 denotes gate side TCP on which a gate side drive circuit IC is mounted, numeral 4 denotes a source side PCB, numeral 5 denotes a gate side PCB, numeral 6 denotes a disconnection portion, numeral 7 denotes a first connection portion, numeral 8 denotes a second connection portion, numeral 91 denotes repair lines.

As shown in FIG. 2, repair lines 91 according to Embodiment 2 of the matrix liquid crystal display device are provided in the form of a repeatable pattern by which the whole display area is divided and repair lines are formed. The repeatable pattern is defined for one TCP on the source side peripheral printed circuit board 4.

In adopting such a divided pattern arrangement as repair lines 91, the arrangement having the repeatable cycle for one TCP, line patterns for three areas G, H and I in areas related to the repair lines 91 (repair line area) can be provided with the the same pattern.

Therefore, also in Embodiment 2 as well as in Embodiment 1, because three areas B, C and D occupied by the bus lines are also defined with the same pattern, the number of the kinds of the line patterns required for the TFT array substrate 1 is reduced to six. It becomes possible to make the number of the masks six or less with which line patterns are provided on the TFT array substrate 1 with high speed access. Therefore, productivity can be enhanced.

Further, the above Embodiments 1 and 2 are illustrated with respect to the 15.1" diagonal size matrix liquid crystal display device. The present invention can be applicable for any sizes and any types each including numbers of pixels.

The optimized division so as to be covered in an exposure area can be achieved.

The matrix liquid crystal display device according to the present invention is the one including the TFT array substrate on which repair lines are provided after divisional exposures on the peripheral area of the TFT array substrate.

The areas for the above repair line are provided in such a manner that at least two line patterns having the same configuration are repeated for every two TCPs or every one TCP. Because the number of the kind of the line patterns for a TFT array substrate is reduced, the number of masks (reticles) required when the line patterns are provided on the TFT array substrate can be reduced. Thus, the effect that cheap matrix liquid crystal display device which are enhanced in productivity can be provided is achieved.

According to the method of fabricating the matrix liquid crystal display device, in the method of fabricating the matrix liquid crystal display device including the TFT array substrate on which repair lines are provided after divisional exposures on the peripheral area of the TFT array substrate, the areas relating to the above-mentioned repair lines are provided in such a manner that at least two line patterns having the same configuration are repeated for every two TCPs or every one TCP.

Therefore, because the number of the kind of the line patterns for a TFT array substrate is reduced, the number of masks (reticles) required when the line patterns are provided on the TFT array substrate can be reduced. Thus, the effect that the method of fabricating the matrix liquid crystal display device by which the matrix liquid crystal display device which are enhanced in productivity can be provided is achieved.

The foregoing is considered as illustrative only of the principles of the invention. Further, because numerous modifications and changes will readily occur to those skilled in the art, it is not desired to limit the invention to the exact construction and operation shown and described, and accordingly all suitable modifications and equivalents may be resorted to falling within the scope of the invention as defined by the claims which follow.

What is claimed is:

1. A method of fabricating a matrix liquid crystal display device including a TFT array substrate and bus and repair lines formed on the TFT array substrate and connected with tape carrier packages, comprising the step of:

forming by divisional exposure repair lines on a periphery of the TFT array substrate such that at least three areas of the repair lines have a same shape and a same line pattern, each of said three areas corresponding to an area of at least one tape carrier package.

2. The matrix liquid crystal display device of claim 1, wherein in said forming step a repeat cycle of said same line pattern of said repair lines is defined by every one tape carrier package.

3. A method of fabricating a matrix liquid crystal display device including a TFT array substrate and bus and repair lines formed on the TFT array substrate and connected with tape carrier packages, comprising the step of:

forming by divisional exposure repair lines on a periphery of the TFT array substrate such that at least two areas of the repair lines have a same shape and a same line pattern, wherein in said forming step a repeat cycle of said same line pattern of said repair lines is defined by every two tape carrier packages.

4. A method of forming a repair line patterning for a matrix liquid crystal display device including a TFT substrate, an opposite substrate arranged opposite to the TFT array substrate, a liquid crystal material interposed between the TFT array substrate and the opposite substrate, and bus lines connected with tape carrier packages, comprising the step of:

forming by divisional exposure repair lines on a periphery of the TFT array substrate, wherein the repair lines are provided such that at least three areas have a same shape and a same line pattern, each of said three areas corresponding to an area of at least one tape carrier package.

5. The method of forming a repair line patterning for a matrix liquid crystal display device of claim 4, wherein in the forming step a repeat cycle of said same line pattern of said repair lines is defined by every one tape carrier package.

6. A method of forming a repair line patterning for a matrix liquid crystal display device including a TFT substrate, an opposite substrate arranged opposite to the TFT array substrate, a liquid crystal material interposed between the TFT array substrate and the opposite substrate, and bus lines connected with tape carrier packages, comprising the step of:

forming by divisional exposure repair lines on a periphery of the TFT array substrate, wherein the repair lines are provided such that at least two areas have a same shape and a same line pattern, wherein in the forming step a repeat cycle of said same line pattern of said repair lines is defined by every two tape carrier package.

* * * * *